United States Patent [19]
Black et al.

[11] Patent Number: 5,382,986
[45] Date of Patent: Jan. 17, 1995

[54] LIQUID-CRYSTAL SUNGLASSES INDICATING OVEREXPOSURE TO UV-RADIATION

[75] Inventors: Michael Black, Foster City; Vladimir Kupershmidt, Pleasanton, both of Calif.

[73] Assignee: Reliant Laser Corporation, Foster City, Calif.

[21] Appl. No.: 971,892

[22] Filed: Nov. 4, 1992

[51] Int. Cl.⁶ .................................................. G02C 7/10
[52] U.S. Cl. ........................................ 351/158; 351/41; 351/44; 250/372
[58] Field of Search ................... 351/41, 44, 45, 46, 351/47, 49, 158; 359/41, 57, 58, 64, 66, 67, 68, 84, 85, 350, 361; 250/372

[56] References Cited

U.S. PATENT DOCUMENTS

| | | | |
|---|---|---|---|
| 4,848,890 | 7/1989 | Horn | 351/44 |
| 4,968,127 | 11/1990 | Russell et al. | 351/158 |
| 5,015,086 | 5/1991 | Okaue et al. | 351/44 |
| 5,114,218 | 5/1992 | Black et al. | 351/158 |
| 5,151,600 | 9/1992 | Black | 351/41 |
| 5,184,156 | 2/1993 | Black et al. | 351/44 |

FOREIGN PATENT DOCUMENTS 2530039  1/1984  France ................. 351/158

*Primary Examiner*—Ricky D. Shafer

[57] ABSTRACT

Liquid crystal sunglasses indicating overexposure to UV-radiation comprising a pair of liquid-crystal lenses (12 and 14) a rim (10), a bridge portion (14) which support the lenses, and a pair of temples (18 and 20) which supported by the rim. The rim (10) supports a pair of solar cells (28 and 30) and a dual-photodetector sensor (26) which can separately measure an incident UV-A radiation and a UV-B radiation and convert these radiations into electric signals. The sunglasses's rim also incorporates a microcontroller (36). The lenses have a laminated structure composed of a color mask (43), an input polarizing plate (44), a liquid crystal cell (50) sandwiched between a pair of voltage-controlled active matrices, and an output polarizing plate (46). Each active matrix consists of a plurality of sets of pixels which control the transmission of light through the respective color cells of a mosaic mask. The microcontroller also incorporates a frequency generator (104) and a memory unit. The memory stores an algorithm for calculating thresholds of UV radiation. When these thresholds are exceeded the lenses give to the wearer a warning signal either changing the color of the lenses or causing blinking.

11 Claims, 3 Drawing Sheets

LIQUID-CRYSTAL SUNGLASSES INDICATING OVEREXPOSURE TO UV-RADIATION

BACKGROUND

1. Field of Invention

The present invention relates to devices for detecting radiation, particularly to devices for determining skin-damaging levels of ultraviolet (UV) radiation.

2. Description of Prior Art

Solar radiation reaching the earth consists of electromagnetic energy ranging from ultraviolet (UV) light to infrared (IR) light. UV radiation is further subdivided into three types: UV-A, UV-B, and UV-C. UV-C radiation has wavelengths in the range of 200 to 285 nanometers (nm) and is totally absorbed by the earth's atmosphere. UV-B, ranging from about 285 to 318 nm, is known to cause skin cancer in humans. UV-A, from about 315 to 400 nm, is mostly responsible for tanning the skin. However, UV-A has also been found to play some role in skin cancer and is the cause of eye cataracts, solar retinitis, and corneal dystrophies.

Based on general principles and techniques for radiometry and photometry, several UV radiation-measuring and warning instruments have been developed and made commercially available.

A personal UV radiometer, described in U.S. Pat. No. 5,008,548 to Nahum Gat, 1991, includes an LCD display, a photocell, and an integrated circuit for processing subject inputs and UV radiation data.

However, this radiometer is unable to correctly monitor levels of UV radiation when it is not directly exposed to solar rays, i.e., when it is placed in the shade. Moreover, the device does not take into account the changes in skin pigmentation which occur while a person is being exposed to solar radiation. Furthermore, this device is not optimally convenient, since it is intended to be attached to an article of clothing and may restrict the movement of a person during vigorous physical activity, for instance, a volleyball game.

Another apparatus, disclosed in U.S. Pat. No. 4,985,632 to Frank Bianco et al., 1991, comprises an electronic wristwatch having a digital readout for displaying the time, the day, and the month. It also incorporates a photodiode for detecting skin-damaging UV radiation, a microcomputer, and four function buttons.

This device, however, is not subject-friendly due to its large number of functions, many of which are superfluous. Moreover, like the radiometer, the wristwatch does not take into account skin pigmentation changes which occur during exposure to UV radiation. Furthermore, it can not monitor UV radiation when placed in the shade.

All of the above cited prior-art devices are based on the assumption that the amount of UV radiation that may be safely tolerated by human skin is independent of the intensity of incident radiation and is determined only by the total accumulated energy. Even though some prior-art devices directly measure the intensity level of incident radiation, this measurement is not factored into the calculation of a safe UV energy threshold.

The applicants propose to solve this problem by providing a noseshade for monitoring exposure to UV radiation by separately measuring UV-A and UV-B radiation doses (U.S. Pat. No. 5,151,600 issued Sep. 29, 1992 to M. Black). The UV radiation control system of the nosepiece incorporates a pair of photodetectors with appropriate narrow-band pass optical filters for transmitting the UV-A and UV-B spectral components, respectively. The outputs of these photodetectors are connected to an integrated central processor unit (CPU). The output of the CPU, in turn, is connected to an indicator, such as a piezoelectric element which produces an audible signal when the daily threshold dose of UV-A radiation is exceeded.

Although such a device may provide a reliable indication of overexposure, it has a number of disadvantages which are the following: 1) it is not a common practice to wear nosepieces because people feel conspicuous covering their noses and are embarrassed to wearing such nosegear; 2) the audible warning signal is not always heard by the wearer, especially when the wearer of the nosepiece in on a noisy beach.

OBJECTS AND ADVANTAGES OF THE INVENTION

It is therefore a principal object and advantage of the invention to solve the above problem by providing sunglasses indicating an overdosage of UV radiation, which look like conventional glasses and which provides an immediate visual indication of the overexposure. Still further advantages and features will become apparent from a consideration of the ensuing description and drawings.

REFERENCE NUMERALS USED IN THE DESCRIPTION AND DRAWINGS

10—frame
12, 14—lenses
16—bridge
18, 20—temples
22, 122—skin-type switch
24, 124—skin-protection factor switch
26—dual-photodetector sensor
28, 30, 128, 130—solar cell
32, 132—liquid-crystal display
36, 136—microcontrollers
43—color mask
44, 144—input polarizing plate
46, 146—output polarizing plate
48, 148—optical path
50, 150—liquid-crystal cell
50a, 50b, 150a, 152b—precision glass plates
51a, 51b, 151a, 151b—polymer films
54, 154—liquid crystal
52a, 52b, 152a, 152b—thin transparent matrices
56a1, 56b1,—pixels
58a1, 58b1—terminals
59a, 59b, 159a, 159b—microcontroller's outputs
62-1, 62-2—color cells
80, 82, 180, 182—photodetectors
84, 86, 184, 186—filters
88, 188—amplifier
90, 190—UV-A output channel
92, 192—UV-B output channel
96, 196—liquid crystal display drivers
98, 198—microprocessors
100, 200—RAM
102, 202—ROM
L—light
104, 204—frequency generators
LC—liquid crystal
TH1, TH2—threshold values
F1, F2—frequencies W—white light

BRIEF DESCRIPTION OF THE DRAWINGS

FIG. 1

Structure of Glasses

Figure 2:
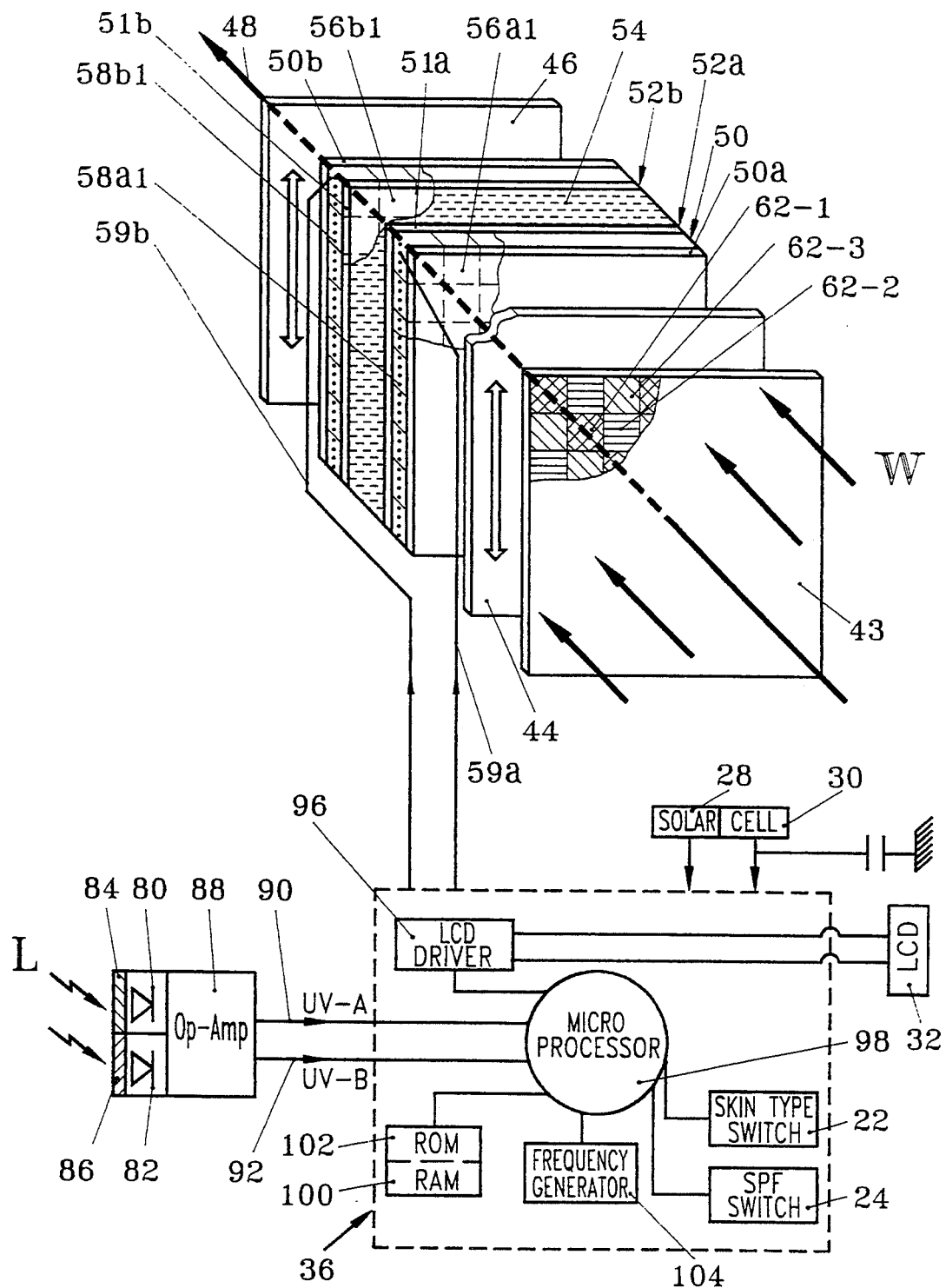
FIG. 2 is a perspective schematic view of an optoelectronic system of color-changing glasses with the color changed in response to an overexposure.

A pair of liquid crystal sunglasses of the invention are shown in a perspective view in FIG. 2.

Similar to conventional glasses, these sunglasses have a frame 10 which supports lenses 12 and 14, and a bridge 16. Temples 18 and 20 are connected to the frame by respective hinges (not shown).

The eyeglasses have several parts partially embedded into the plastic material of frame 10. It is preferable that these parts be invisible or inconspicuous. For this purpose, these parts should either have the same color as the frame or should be molded out of dark plastic. Alternatively, the parts can have a complementary or highly contrasting color for design purposes.

The partially embedded parts are the following: a dual photodetector sensor 26, a solar cell source composed of a pair of solar cells 28 and 30 located above lenses 12 and 14, respectively, a liquid-crystal display 32 located in one of the temples, e.g., in temple 20, a skin-type data input switch 22, and a skin-protection factor input switch 24. Embedded into the material of the glass rim are an integrated-circuit (IC), memory units, and a microprocessor (not shown).

Lenses 12 and 14, which will be described in detail later, comprise a laminated structure which contains activated color-control transparent liquid crystals having terminals (not shown) connected to the outputs of a microcontroller 36 which will be described later.

Prior to a consideration of microcontroller 36, the structure of the lenses will be described. By a command issued from microcontroller 36, lenses 12 and 14 can be switched to different colors, providing thereby a color-coded indication of the fact that the prescribed UV-exposure threshold has been exceeded.

Now the structure of lenses 12 and 14 will be described in detail. Since both lenses are identical in internal structure and differ only in shape, only one lens, e.g., lens 12, will be described. Furthermore, since the lenses relate to the field of polarizing optics, prior to their description and for a better understanding of the terminology used in the specification, it will be helpful to explain the structure of typical elements of a blocking filter utilizing polarizing optics.

Polarization Optics

It is known that if a light is passed through a polarization element, e.g., a polarization plate, the direction of the electrical field of the light will become oriented parallel to the optical axis of the polarization plate. In other words, the light becomes polarized.

If a second polarization plate is installed parallel to the first plate and in the optical path of the polarized light, the polarized light will pass through the second plate only if the optical axis of this second plate is aligned with that of the first one. If the optical axes of the plates are 90° apart (crossed polarizers), the polarized light will be blocked by the second polarization plate.

The intensity of the light passed through both plates can be varied between full transmission and full blocking by changing the relative angle between the optical axes of both plates from 0° to 90°.

Those polarizers which have their axes adjustable with respect to each other are known as tunable polarizers. Tunable polarizers find wide application in electro-optics, e.g., in a voltage-controlled liquid crystal retarder which is a device consisting of an input polarizer, an alignment plate, a liquid crystal, and an output polarizer. See, e.g., "Properties of Tunable Nematic Liquid Crystal Retarders" by Scott E. Gilman, et al., (Meadowlark Optics, Longmont, Colorado), and Narendra K. Shankar, Transactions of Cornell University, School of Electrical Engineering, Ithaca, New York), 1990. All four elements of the system are arranged sequentially on the same optical path. The input polarizer polarizes the white incident light. The alignment plate and liquid crystal are used as an integral unit and rotate the optical axis of the polarized light by means of a voltage applied to the liquid crystal, while the output polarizer passes the light treated by the system.

However, this tunable retarder is applicable for blocking light of a given wavelength and cannot be used for selectively blocking lights of different wavelengths. For example, if the light is a mixture of green and red components, the aforementioned tunable retarder cannot block only green and pass only red light.

FIG. 2

Lens Structure

As shown in FIG. 2, lens 12 (shown as having a square shape in order to facilitate illustration) consists of a color mask 43, an input polarizing plate 44 and an output polarizing plate 46. The optical axes of both plates are parallel. In all the drawings, the directions of polarization are shown by double-pointed arrows.

Plates 44 and 46 are located on a common optical path 48. In the illustrated example, plate 44 polarizes white incident light in the vertical (Y) direction, while plate 46 also passes this light because its optical axis is parallel to that of plate 44. The optical axes of the polarization plates are never changed.

Arranged between polarizing plates 44 and 46 is a liquid crystal (LC) cell 50 which is formed by two precision glass plates 50a and 50b. The inner surface of each of the glass plates 50a and 50b is coated with a thin transparent matrix 52a and 52b, respectively, while the later, in turn, is coated with a respective polymer film 51a and 51b.

The space between polymer films 51a and 51b is filled with an LC 54 which looks like a transparent solution with molecules which can be mechanically aligned (to form a uniaxial layer) and electrically rearranged (Photonics Spectra, April 1990, p. 82) to change the polarization direction.

Each matrix 52a and 52b is made of an electrically conductive transparent material and is divided into individual isolated pixels (microscopic cells) 56a1, 56a2 . . . 56an (matrix 52a), 56b1, 56b2, . . . 56bn (matrix 52b). These pixels can be individually addressed and controlled through terminals 58a1, 58b1, 58a2, 58b2, 58an . . . 58bn, where the terminals designated by "a" relate to active matrix 52a and the terminals designated by "b"

relate to active matrix 52b (only terminals 58a1 and 58b1 are shown in FIG. 2, since "n" may be a very large number).

Each pixel is activated by a voltage supplied to it via a respective terminal. For example, pixel 56a1 is activated through terminal 58a1 and pixel 56b1 is activated through terminal 58b1. The pixels are activate in pairs, i.e., a pair of pixels located opposite each other and symmetrical to LC cell 50 is activated simultaneously through respective terminals.

Although in the drawings each oppositely-arranged pixel of the pair is designated by reference numeral 56 with a respective letter "a" or "b" (i.e., 56a and 56b), further in the description only one reference numeral 56 will be used for the sake of simplicity, keeping in mind that in reality this refers to a pair of oppositely arranged pixels.

When no voltage is applied to a given pixel, light passing through this pixel is turned by 90° with respect to the direction of polarization provided by input plate 44. Therefore, this light will be blocked by output polarization plate 46. As a result, no light will pass through this given pixel.

When a voltage exceeding a threshold which ensures the switching of the direction of polarization by this pixel is applied, the pixel will pass the polarized white incident light and will not change the direction of its polarization. Such light will pass through output plate 46 and will reach a respective cell of color mask 43 which will be described later.

Each terminal on the matrix is connected to a respective output of microcontroller 36. For the sake of simplicity all these outputs for the individual terminal of the matrix are shown as two outputs 59a and 59b, although in an actual construction the number of outputs will correspond to the number of pixels in the lenses. In reality, each pixel is controlled and directly addressed to a respective output of microcontroller 36 through an individual lead wire.

The first element of the lens of FIG. 2 in the path of white incident light W is color mask 43. Mask 43 comprises a plate in a plane parallel to LC cell 50 and consists of individual color cells 62-1, 62-2, 62-3, ... 62-n. Each color cell 62-1, 62-2, 62-3, ... 62-n has the same dimensions as respective pixel pair 56a1 and 56b1. 56a2 and 56b2, ... 56an and 56bn. Each color cell is also an exact projection of a respective pixel pair onto color mask 43.

Mask 43 is a mosaic of periodically arranged cells of different colors. For example, color cell 62-1 is orange, color cell 62-2 is blue, and color cell 62-3 is green. In view of the fact that the drawings are printed in black-and-white, the different colors are designated by the hatchings shown in FIG. 3. Although only three different colors are shown, in practice that mask may have cells of less than three or more than three colors. Also for simplicity, the operation of the mask will be illustrated with reference only to a group of adjacent cells which will be shown in respective color code, while the colors of the remaining cells will not be shown.

Individual pixels 56a1, 56b1, 56a2, 56b2 ..., and thus color cells 62-1, 62-2, ... have small dimensions. E.g., with a range of 20 to 100 cells per centimeter, when mask 43 passes through its respective cells a light of a predetermined color, a human eye can see the entire lens in a continuous monochromatic color, without visible degradation into cells. This principle is used in conventional color TV tubes whose surface consists of a plurality of color dots.

Each color cell is made of a material selectively transparent to a light of a given wavelengths. It may be a color glass, color polymer, etc. In other words, each color cell is a color filter, preferably a narrow-band color filter. In technical terms, such a mosaic-type mask may be prepared by merely assembling the entire unit from elementary color cells; or, each cell may be prepared photolithographically by selectively exposing, etching, and processing a multiple-layer plate.

Thin-film indium-tin oxide, which is the basic material of active matrix 20, is produced, e.g., by Tosoh SMD Co., Japan. The company produces a one-piece film having the dimensions of from 50.8 mm to 304.8 mm in diameter, up to 127×254 mm.

Some materials mentioned above are used by a number of companies in their latest technology (Hitachi America Ltd., Ill.; Optical Imaging Systems Inc., Mich.; and others) for the production of active-matrix liquid-crystal displays (AMLCD), e.g., for color TV or color projection screens.

At the present time, all materials and optical elements required for bringing the invention into practice are available on the market and produced commercially. For example, thin-film linear polarizers and LC cells are produced by Medowlark Optics, supra. The polarizers are manufactured with diameters in the range of 3.17 mm to 50.8 mm, and with thicknesses within the range of 200 μm to 2 mm. The same products are manufactured many other optical companies.

To an external viewer, mask 43 will look like a color mosaic which makes the glasses more attractive in appearance and increases their commercial value.

Lens 12 is about 5 cm by 5 cm across, and about 3 to 5 mm thick. Mask 43 has from 400 to 10000 cells per sq. cm. of its surface.

FIG. 2

Description of Dual Photodetector and Microcontroller

As shown in FIG. 2, dual photodetector sensor 26 consists of two identical UV-enhanced photodetectors 80 and 82. A sensitive area of each photodetector is covered by an optical band-pass filter, i.e., photodetector 80 is covered by a filter 84 which transmits only a UV-A spectral range of incident solar radiation, while photodetector 82 is covered by a filter 86 which transmits both a UV-A and UV-B radiation.

Output ends of both photodetectors 80 and 82 are connected to a built-in amplifier unit 88, which has two output channels, i.e., a UV-A output channel 90 and a UV-B output channel 92. These output channels are electrically connected to an input of microcontroller 36.

Microcontroller 36 includes a microprocessor 98, a liquid crystal display (LCD) driver 96 which is connected to microprocessor 98 and which controls the operation of a liquid crystal display (LCD) 32, as well as the liquid crystals of lenses 12 and 14. Microcontroller 36 also includes a random-access-memory (RAM) unit 100, read-only-memory (ROM) unit 102, and a frequency generator 104, the input of which is connected to microprocessor 98. The outputs of LCD driver 96 are connected to the terminals of matrices 56a1, 56b1, etc. Frequency generator 104 can generate signals of two different frequencies with different amplitudes. Although two outputs are shown in FIG. 2, it is understood that the number of these outputs corresponds to the number of matrices. Frequency generator 104 is necessary to stabilize the operation of liquid crystals and to prevent their aging. RAM 100, ROM 102, and frequency generator 104 are connected to microprocessor 98.

The above-mentioned input data switch 24 and skin-protection factor switch, which are located on the outer side of rim 10, also constitute parts of microcontroller 36. A pair of outputs (not shown) of microcontroller 36 is connected to solar cells 28 and 30, respectively.

Microprocessor 98 is programmed for two predetermined thresholds TH1 and TH2. Both thresholds correspond to the given type of skin and the skin-protection factor (SPF). Threshold TH1 corresponds to the maximum allowable UV-A radiation dose which is responsible for tanning, overheating, skin burning, and similar short-term effects. Threshold TH2 corresponds to the maximum allowable UV-B radiation which is responsible for long-term effects, such as skin cancer and related diseases. These thresholds are stored in ROM 102. ROM 102 also stores values of signal amplitudes corresponding to different colors. When threshold TH1 is exceeded, microprocessor 98 switches lenses 12 and 14 through lCD driver 96 to another color by changing the amplitude of the signal, and when threshold TH2 is exceeded, microprocessor 98 changes the amplitude of the signal for a second time, so that lenses 12 and 14 are switched to a third color.

Microprocessor 98 also is programmed so that upon switching to another color after threshold TH1 is reached, the new color will be maintained for a predetermined period of time, e.g., 5 min., and then lenses 12 and 14 will return to their original color state. After reaching threshold TH2, the third color, e.g., yellow, will be maintained constantly, thus giving a warning signal that the dangerous long-term dose has been accumulated.

Such time control is achieved due to synchronization with frequency generator 104.

FIGS. 1 AND 2

Operation

Based on the subject's input data, such as the type of skin and a skin protection factor, microcontroller 36 determines a UV radiation exposure dosage acceptable for a particular person.

Two criteria are used for determining such a dosage. One of these is the amount of total accumulated UV energy, which is a time-independent quantity determined for each type of skin on the basis of medical statistical data. When the total amount of UV energy accumulated by a subject's skin exceeds the statistically estimated value, any additional sun exposure of the subject may cause irreversible changes of the subject's skin structure, e.g., cancer.

The other criteria for determining an acceptable UV radiation dose is the intensity level of incident UV-A radiation. This criterion determines the daily UV radiation dose allowable for a subject, taking into account the subject's skin type, skin-type changes, and SPF.

To accurately monitor UV radiation levels, a subject must enter the data consisting of the subject's skin type and corresponding SPF using input data switch 22 and skin-protection factor switch 24.

Until the threshold corresponding to UV-A channel 90 has been reached, liquid-crystal lenses 12 and 14 maintain a given color, e.g., a green color, since the voltage commands from microcontroller 36 are being sent from outputs 59a and 59b to green-color pixels. When threshold TH1 is reached, microcontroller 36 sends, through LCD driver 96, respective commands to pixels, which control another color, e.g., of an orange color. Such a color change is used as an immediate warning signal to the wearer that the dangerous UV-A radiation dose has been achieved. The new color will be maintained over a short period of time, e.g., 5 min. This is achieved due to synchronization with frequency generator 104.

The principle of operation of the color-changing lenses 12 and 14 and the color-changing process are described in detail in U.S. Pat. No. 5,114,218 issued in 1992 to M. Black.

When threshold TH1 is exceeded, microcontroller 98 changes the amplitude of the signal from A1 to A2 whereby liquid-crystal lenses 12 and 14 are switched to the orange color. The orange color is be maintained for a predetermined period of time, e.g., 5 min., and then lenses 12 and 14 return to their original green-color state. This first color change is a warning signal to the subject that the allowable UV-A radiation dosage has been exceeded. After reaching threshold TH2, the third color, e.g., yellow, appears through the action of the same mechanism as the one for the green color change. However, the yellow-color state is kept constant as a warning signal that the dangerous long-term dosage has been accumulated. The above-described time control also is achieved due to synchronization with frequency generator 104.

FIG. 3

Sunglasses with Change of Lens Density as Overdose Indication

Figure 3:
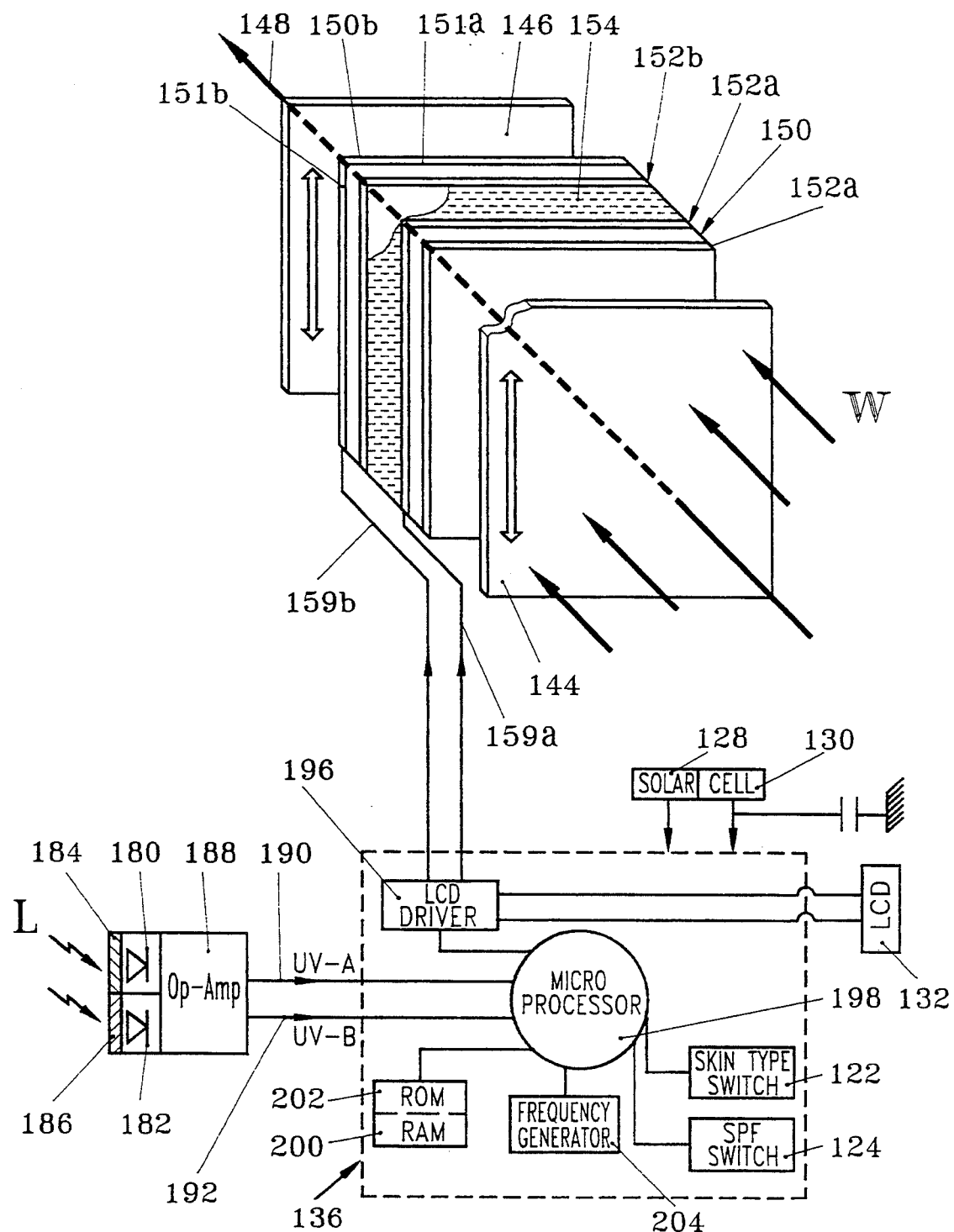
FIG. 3 is a perspective schematic view of an optoelectronic system of monochromatic glasses with the density of color changed in response to overexposure.

FIG. 3 is a perspective schematic view of an optoelectronic system of monochromatic glasses with the density of color changed response to overdose.

Figure 1:
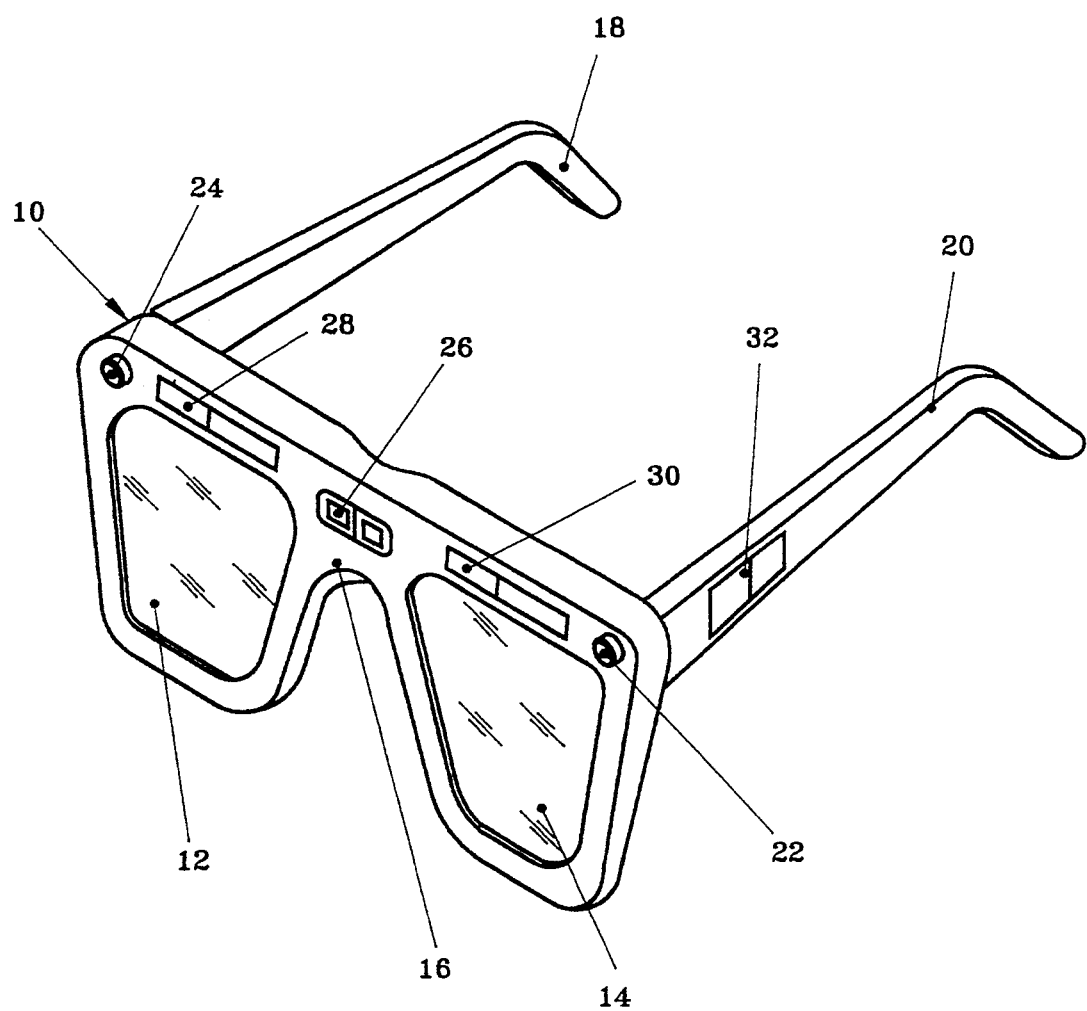
FIG. 1 is a perspective view of a pair of liquid crystal sunglasses of the invention.

In this embodiment, the structure and appearance of the glasses are the same as those in FIGS. 1 and 2, respectively. The only difference is that lenses 12 and 14 do not have mask 43 and that matrices 52a and 52b are replaced by continuous electrodes 152a and 152b. In fact, in this embodiment the structure corresponds to lenses of the previous embodiment, but with a single pixel. In FIG. 3, those parts which are identical to corresponding parts of the system of FIG. 2, are designated by the same reference numerals, which are increased by increments of one hundred.

A microcontroller 136 of the sunglasses of FIG. 3 has the same structure as microcontroller 36, with the exception that LCD driver 196 has only two outputs which are connected to lenses 12 and 14, respectively.

Under the control of microcontroller 136, frequency generator 204 may generate signals with a first frequency F1 and a second frequency F2. Frequency F1 is higher than a frequency of reaction of a human eye, while frequency F2 is lower than a frequency of reaction of a human eye. As a result, when lenses 12 and 14 receive from a liquid crystal display driver 196 a signal having first frequency F1, the subject sees a noninterrupted light, and when the lenses receive a signal having second frequency F2, the subject sees a blinking light.

A microprocessor 198 is programmed for the same two predetermined thresholds TH1 and TH2. When threshold TH1 is exceeded, microprocessor 198 switches the frequency from F1 to F2 so that LCD driver 196 is driven with frequency F2. This causes liquid-crystal lenses 12 and 14 to blink for a predetermined period of time as an overexposure warning signal, and when threshold TH2 is exceeded, microprocessor 198 switches through LCD driver 196 lenses 12 and 14 to a colorless state by reducing the amplitude of the signal to zero. The colorless state remains unchanged as a constant warning signal about the overexposure.

FIGS. 1 AND 3

Operation

Sunglasses of FIG. 3 operate in the same manner as those of FIGS. 1 and 2.

When threshold TH1 is exceeded, under control of microprocessor 198, frequency generator 204 changes its frequency whereby lenses 12 and 14 begin to blink. Blinking is maintained for a predetermined period of time, e.g., 5 min., and then lenses 12 and 14 return to their original state. The blinking is a warning signal to the subject that the allowable UV-A radiation exposure has been exceeded. After reaching threshold TH2, microprocessor 198 discontinues to supply voltage to liquid-crystal lenses, whereby these lenses become colorless. This colorless state of the sunglasses is kept constant as a warning signal that the dangerous long-term dose has been accumulated. The above-described time control also is achieved due to synchronization with frequency generator 204.

SUMMARY, RAMIFICATIONS, SCOPE

Thus, it has been shown that we have provided sunglasses indicating an overexposure to UV radiation which look like conventional glasses and which provide an immediate visual indication of overdosage.

Although the glasses have been shown and described in the form of one specific embodiment, this embodiment, its parts, materials, and configurations have been given only as examples. Many other modifications of active matrices, LC cell, and color mask are possible. The color mask may contain cells of less or more than three colors and the mosaic can be composed of greater or smaller number of color cells than that shown in FIGS. 1 and 2.

In the embodiment of FIG. 3, instead of discontinuing to supply the voltage after reaching the second threshold, the microprocessor may supply a signal for sending another voltage to the lenses, so that instead of being colorless, the lenses will acquire another hue of the same color. Therefore, the scope of the invention should be determined, not by the example given, but by the appended claims and their legal equivalents.

What we claim is:

1. Liquid crystal sunglasses indicating overexposure of a subject to UV-radiation comprising:

a pair of liquid-crystal lenses;

a rim and a bridge portion which support said lenses;

a pair of temples supported by said rim;

a solar-cell power source;

a dual-photodetector sensor supported by said rim for measuring incident UV-radiation and converting said radiation to electric signals; and a microcontroller connected to said solar-cell power source;

each of said lenses comprising a laminated structure composed of a at least one color cell, an input polarizing plate, a liquid crystal cell sandwiched between a pair of voltage-controlled active matrices, and an output polarized plate, each said active matrix consisting of at least one pixel which controls the transmission of light through said at least one cell;

said input polarizing plate, said liquid crystal cell with said active matrices, and said output polarizing plate being arranged sequentially in the direction of incident light;

said active matrices being electrically connected to said microcontroller;

said microcontroller having input means, output means, memory means for storing a dose information, a first-threshold value, and a second threshold value, a frequency generator which may generate signals with different parameters, a liquid crystal display driver connected to said lenses, and a microprocessor connected to said liquid crystal display driver, said memory means, said frequency generator, and said dual photodetector for receiving said electric signals.

2. The liquid crystal sunglasses of claim 1 wherein said memory means comprises a random-access memory and a read-only memory, said threshold values are stored in said read-only memory, said microcontroller further including:

a skin-type switch for entering information about the skin type of said subject;

a skin-protection factor switch for entering information about a lotion applied onto the skin of said subject, said skin-type switch and said skin-protection factor switch being electrically connected to said microprocessor; and a liquid crystal display which is connected to said liquid crystal display driver and shows said information about said lotion and said skin type of said subject.

3. The liquid crystal sunglasses of claim 2 wherein said different parameters of said signals are their frequencies which comprise a first frequency which is higher than a frequency of reaction of a human eye and a second frequency which is lower than a frequency of reaction of a human eye, so that when said lenses receive from said liquid crystal display driver a signal having said first frequency, said subject sees a noninterrupted light, and when said lenses receive a signal having a second frequency, said subject sees a blinking light.

4. The liquid crystal sunglasses of claim 1 wherein each said lens further includes a mosaic color mask which is composed of at least three sets of periodically arranged color cells for a first color, a second color, and a third color, respectively, so that, when components of said incident UV-radiation pass through said input polarizing plate, they are selectively filtered in accordance with their color.

5. The liquid crystal sunglasses of claim 4 wherein said color cells being combined into sets, each set corresponding to a predetermined color, said liquid crystal display driver being connected through said microprocessor to respective pixels of said active matrices.

6. The liquid crystal sunglasses of claim 5 wherein the number of said signals with different parameters are at least three, said parameters are amplitudes of said signals which comprise a first amplitude corresponding to said first color, a second amplitude which corresponds to said second color, and a third amplitude which correspond to said third color.

7. Liquid crystal sunglasses indicating overexposure of a subject to UV-radiation comprising:
   a pair of liquid-crystal lenses;
   a rim and a bridge portion which support said lenses;
   a pair of temples supported by said rim;
   a solar-cell power source;
   a dual-photodetector sensor supported by said rim for measuring incident UV-radiation and converting said radiation to electric signals; and
   a microcontroller connected to said solar-cell power source;
   each of said lenses comprising a laminated structure composed of a color mosaic mask, an input polarizing plate, a liquid crystal cell sandwiched between a pair of voltage-controlled active matrices, and an output polarizing plate;
   said mask, said input polarizing plate, said liquid crystal cell with said active matrices, and said output polarizing plate being arranged sequentially in the direction of said incident UV-radiation, each said active matrix consisting of a plurality of pixels which control the transmission of light through said at least one cell;
   said input polarizing plate, said liquid crystal cell with said active matrices, and said output polarizing plate being arranged sequentially in the direction of incident light;
   said active matrices being electrically connected to said microcontroller;
   said microcontroller having input means, output means, memory means for storing a dose information, a first-threshold value, and a second threshold value, a frequency generator which may generate signals with different parameters, a liquid crystal display driver connected to said lenses, and a microprocessor connected to said liquid crystal display driver, said memory means, said frequency generator, and said dual photodetector for receiving said electric signals.

8. The liquid crystal sunglasses of claim 7 wherein the number of said signals with different parameters are at least three, said parameters are amplitudes of said signals which comprise a first amplitude corresponding to said first color, a second amplitude which corresponds to said second color, and a third amplitude which correspond to said third color.

9. Liquid crystal sunglasses indicating overexposure of a subject to UV-radiation comprising:
   a pair of liquid-crystal lenses;
   a rim and a bridge portion which support said lenses;
   a pair of temples supported by said rim;
   a solar-cell power source;
   a dual-photodetector sensor supported by said rim for measuring incident UV-radiation and converting said radiation to electric signals; and
   a microcontroller connected to said solar-cell power source;
   each of said lenses comprising a laminated structure composed of a single color cell, an input polarizing plate, a liquid crystal cell sandwiched between a pair of voltage-controlled active matrices, and an output polarized plate;
   said input polarizing plate, said liquid crystal cell with said active matrices, and said output polarizing plate being arranged sequentially in the direction of incident light;
   said liquid crystal cell being electrically connected to said microcontroller;
   said microcontroller having input means, output means, memory means for storing a dose information, a first-threshold value, and a second threshold value, a frequency generator which may generate signals with different parameters, a liquid crystal display driver connected to said lenses, and a microprocessor connected to said liquid crystal display driver, said memory means, said frequency generator, and said dual photodetector for receiving said electric signals.

10. The liquid crystal sunglasses of claim 9 wherein said memory means comprises a random-access memory and a read-only memory, said threshold values are stored in said read-only memory, said microcontroller further including:
   a skin-type switch for entering information about the skin type of said subject;
   a skin-protection factor switch for entering information about a lotion applied onto the skin of said subject, said skin-type switch and said skin-protection factor switch being electrically connected to said microprocessor; and
   a liquid crystal display which is connected to said liquid crystal display driver and shows said information about said lotion and said skin type of said subject.

11. The liquid crystal sunglasses of claim 10 wherein said different parameters of said signals are their frequencies which comprise a first frequency which is higher than a frequency of reaction of a human eye and a second frequency which is lower than a frequency of reaction of a human eye, so that when said lenses receive from said liquid crystal display driver a signal having said first frequency, said subject sees a noninterrupted light, and when said lenses receive a signal having a second frequency, said subject sees a blinking light.

* * * * *